Figure 3:
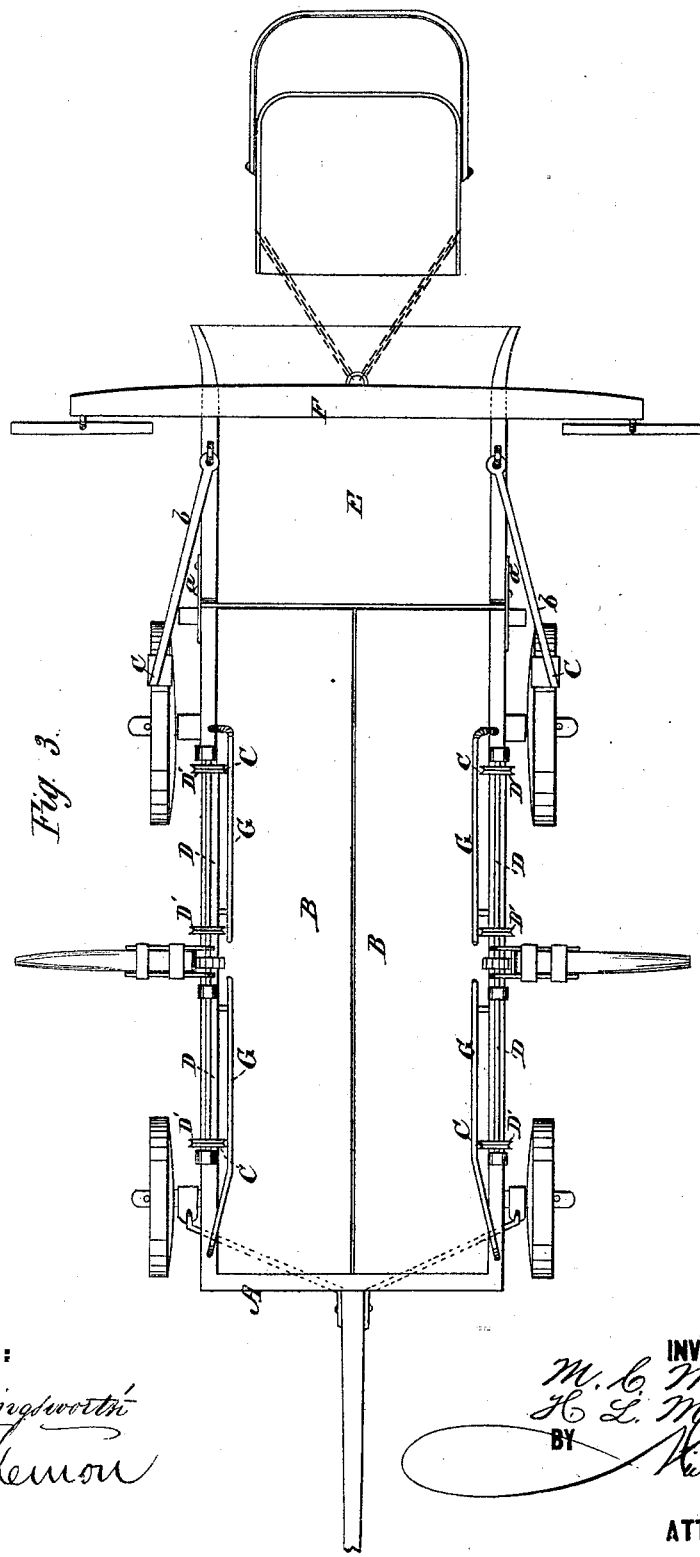

M. C. & H. L. MEIGS.
DUMPING-WAGON.
No. 176,028.
2 Sheets—Sheet 1.
Patented April 11, 1876.
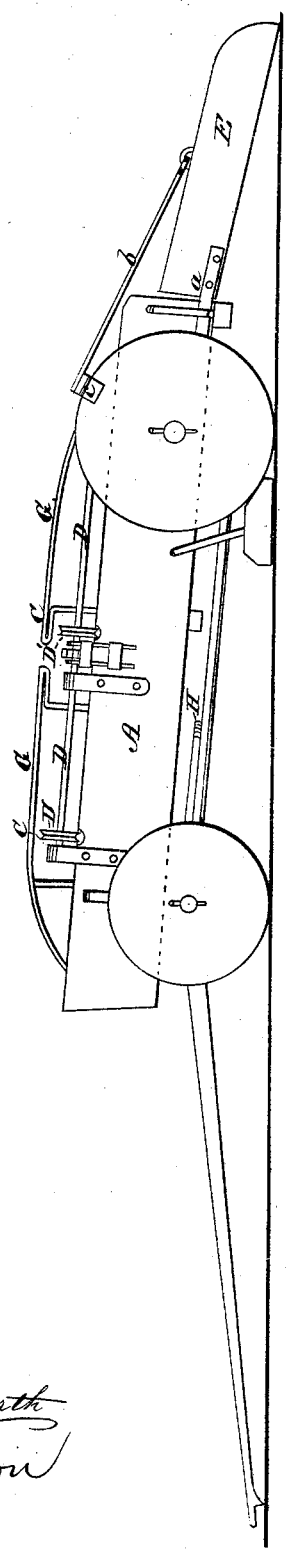
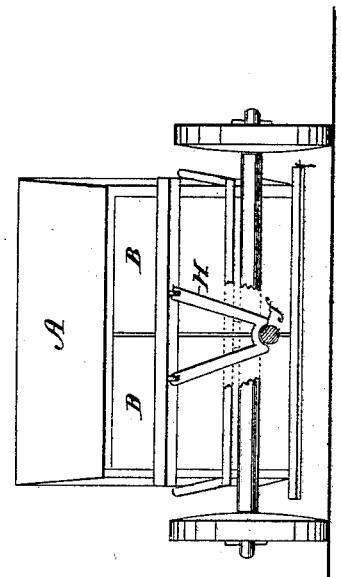
WITNESSES:
W. W. Hollingsworth
John C. Kenun
INVENTOR:
M. C. Meigs
H. L. Meigs
BY
ATTORNEYS.

2 Sheets—Sheet 2.

M. C. & H. L. MEIGS.
DUMPING-WAGON.

No. 176,028. Patented April 11, 1876.

WITNESSES:
W. W. Hollingsworth
[signature]

INVENTOR:
M. C. Meigs
H. L. Meigs
BY [signature]
ATTORNEYS.

UNITED STATES PATENT OFFICE.

MONTGOMERY C. MEIGS AND HENRY L. MEIGS, OF ROMNEY, INDIANA.

IMPROVEMENT IN DUMPING-WAGONS.

Specification forming part of Letters Patent No. 176,028, dated April 11, 1876; application filed January 22, 1876.

*To all whom it may concern:*

Be it known that we, MONTGOMERY C. MEIGS and HENRY L. MEIGS, of Romney, in the county of Tippecanoe and State of Indiana, have invented a new and Improved Dumping-Wagon; and we do hereby declare that the following is a full, clear, and exact description of the same, reference being had to the accompanying drawing, forming a part of this specification, in which—

Figure 1 is a side elevation; Fig. 2, an end view, with the front of the wagon-body raised; Fig. 3, a plan view.

This invention relates to certain improvements upon the dumping-wagon for which Letters Patent No. 166,125 were granted us July 27, 1875. It consists in a single detachable skid, adapted to be attached to the end of the wagon, to be used as an inclined way, up which the loading-scoop is drawn. This skid is provided with pivoted arms, with rests at the extremities, which are placed upon the wheels. Upon these arms a double-tree of greater length than the width of the wagon is drawn up with the scoop, the horses being attached to the ends thereof, and walking upon opposite sides of the wagon. The invention also consists in guard-rails placed upon the side of the wagon, operating, in connection with the double-tree, to prevent the latter from deranging the devices for lifting the bottom sections of the wagon. It also further consists in a support pivoted to the bottom of the front end of the wagon, and provided with a notch which, when the end of the wagon is raised, falls upon the reach from the action of gravity, and supports the wagon in an elevated position, so as to accommodate the front wheels in short turning.

In the drawing, A represents the body of our wagon mounted upon low axles, and having bottom sections B raised by cords or chain C, shafts D, and ratchet-wheel with lever and pawl, all substantially as embodied and claimed in our previous patent, except that instead of using a continuous roll, upon which the cords are wound, we use a shaft with groove, sheaves, or pulleys D'. Instead of using two skids, and driving the team through the wagon, as in our patent referred to, we use a single skid, and drive the horses upon opposite sides of the wagon. In carrying out this idea we construct the skid or inclined way E with projections or hooks *a* for attachment to the rear of the wagon, and pivoted arms *b*, with rests *c* to hold the arms upon the wheel. In connection with this we use a double-tree, F, of greater length than the width of the wagon to which the scoop is attached. The horses are now attached to the opposite ends of the double-tree, and the scoop drawn into the wagon, the arms *b* serving as guides for the double-tree over the wheels and the end of the wagon, so that the said double-tree rides thereupon instead of meeting with the obstruction which the wheels would afford. The horses thus pass upon opposite sides of the wagon, and the scoop, after being delivered of its load, is dragged over the other end of the wagon, and drops to the ground, ready for a new load. To guide the double-tree along the sides of the wagon, and prevent it from hitching into the devices employed for hoisting the bottom sections, we construct upon the sides of the wagon guard-rails G, which project above said devices, and support the double-tree in its passage. To facilitate turning after the load has been dumped we arrange, as in our previous patent, the body of the wagon to be lifted up at the front end, and maintained in an elevated position, so as to allow the wheels to pass under the same in short turning; but for this purpose we employ a different construction. Instead of using the notched pivoted bars upon each side of the wagon-body on the axle, which have each to be adjusted by the hand, we now employ a single swinging support, H, pivoted to the bottom of the wagon, and having a notch, *f*. When the wagon-body is lifted in front, this support drops, from the action of gravity, with its notch upon the reach in proper position to maintain the wagon in elevated position.

In order to employ these wagons in the most advantageous way a number of them are to be used, so as to keep the loading team, of one man, two boys, and two mules or horses, always busy. Each wagon has its draft-team and driver, and, being moved to position for loading, the team is detached and hitched to a previously-loaded wagon, which is driven off to the dumping-ground, and its place taken by another wagon, to which the skid is quickly attached. With two wagons, thus worked, we have hauled and distributed over a field, within a distance of ten to twenty rods, sixteen to eighteen cubic yards of earth in one hour, at which rate the same force would easily accomplish a day's work of one hundred and sixty cubic yards.

Having thus described our invention, what we claim as new is—

1. The combination, with the wagon, of the double-tree of greater length than the width of the wagon, and the skid E, having pivoted arms $b$, with rests $c$, substantially as and for the purpose described.

2. The combination of the guard-rails G with the wagon having hoisting devices D D', and the double-tree of greater length than the width of the wagon, substantially as and for the purpose described.

3. The combination, with the wagon-body and the reach, of the swinging support H, pivoted to the bottom of the wagon-body, and having notch $f$, as and for the purpose described.

MONTGOMERY C. MEIGS.
HENRY L. MEIGS.

Witnesses:
W. J. ATWELL,
EDWARD GROENENDYKE.